Dec. 15, 1959
K. G. HERNQVIST
2,917,627
WAVEMETER
Filed Oct. 29, 1954
2 Sheets-Sheet 1
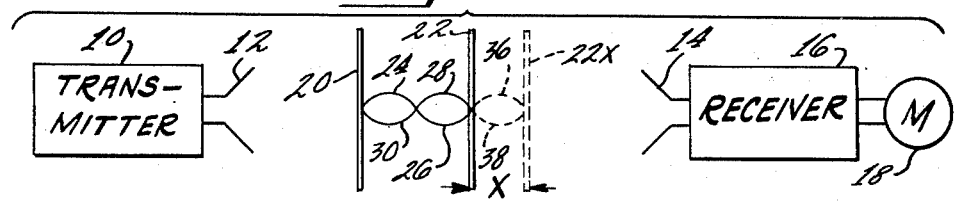
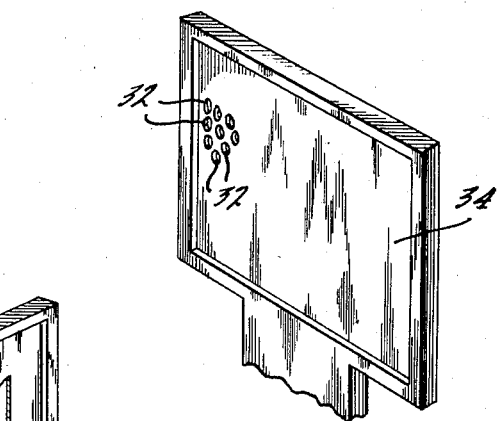
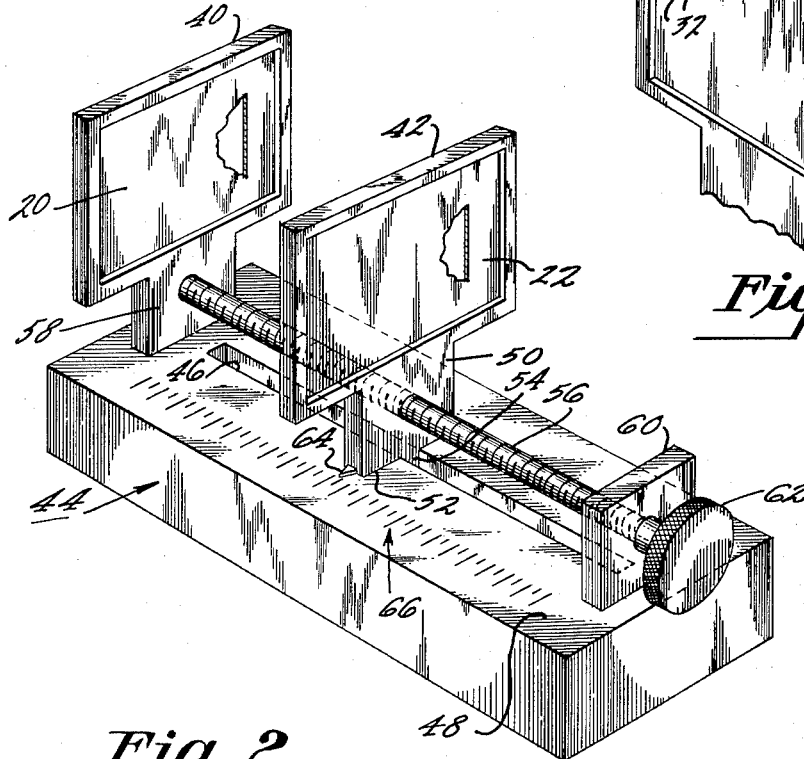
INVENTOR.
KARL G. HERNQVIST
BY
ATTORNEY Dec. 15, 1959     K. G. HERNQVIST     2,917,627
WAVEMETER Filed Oct. 29, 1954     2 Sheets-Sheet 2

INVENTOR.
KARL G. HERNQVIST
BY
ATTORNEY

United States Patent Office 2,917,627
Patented Dec. 15, 1959

2,917,627

WAVEMETER

Karl G. Hernqvist, Princeton, N.J., assignor, by mesne assignments, to the United States of America as represented by the Secretary of the Army Application October 29, 1954, Serial No. 465,530

11 Claims. (Cl. 250—39)

This invention relates generally to wavemeters, and more particularly to a microwavemeter of the microwave interferometer type adapted to measure wavelengths in the centimeter and millimeter wavelength regions.

It has been proposed to measure the wavelength of microwaves by the use of wavemeters employing, for example, either an adjustable resonant cavity, a tuned transmission line or a bolometer-bridge arrangement. Wavemeters of this type are relatively difficult to build when they are adapted to measure wavelengths shorter than five millimeters. Because of the exacting construction required for these prior art wavemeters their costs are also relatively high.

Accordingly, it is a principal object of the present invention to provide an improved wavemeter adapted to measure wavelengths in the centimeter and millimeter wavelength regions.

Another object of the present invention is to provide an improved wavemeter of the microwave interferometer type that is relatively less complicated in construction in comparison to prior art wavemeters.

A further object of the present invention is to provide an improved wavemeter that is simple in construction and operation, relatively economical and easy to manufacture, and yet highly efficient and accurate in use.

These and further objects of the present invention are attained in an improved wavemeter comprising at least two thin plates having a high microwave reflectivity and relatively low internal losses when in the path of the microwaves whose wavelength it is desired to measure. Means are provided to move the plates with respect to each other and in parallel alignment therewith. To measure the wavelength of microwaves of a constant frequency, the microwaves are transmitted directionally to a nearby microwave receiver. The wavemeter is placed in the path of the directed microwaves, between the transmitter and the receiver. The wavemeter is positioned so that its plates are parallel to each other in the path of the microwave transmission and transverse to the direction of transmission. The plates are now moved relative to each other, along the line of transmission, until the signals received by the microwave receiver reach a peak intensity. Under these conditions there exists an integral number of half wavelengths of the microwaves between the plates. A plurality of plates may be used to obtain sharper output peak intensities from the receiver. The plates may comprise either dielectric materials having relatively high dielectric constants, or they may comprise highly conductive metals having perforations therethrough with the area of the perforations being substantially equal to 50 percent of the total area.

The novel features of the present invention, as well as the invention itself, both as to its organization and method of operation will be understood in detail from the following description when considered in connection with the accompanying drawing, in which similar reference characters represent similar elements, and in which:

Fig. 1 is a schematic showing, partly in block diagram form, illustrating an arrangement of components for measuring the wavelength of microwaves in accordance with the present invention;

Fig. 2 is a perspective view of a preferred embodiment of a wavemeter for measuring the wavelength of microwaves in accordance with the present invention;

Fig. 3 is a perspective view of a plate assembly adapted for use in the wavemeter of Fig. 2;

Figure 4:
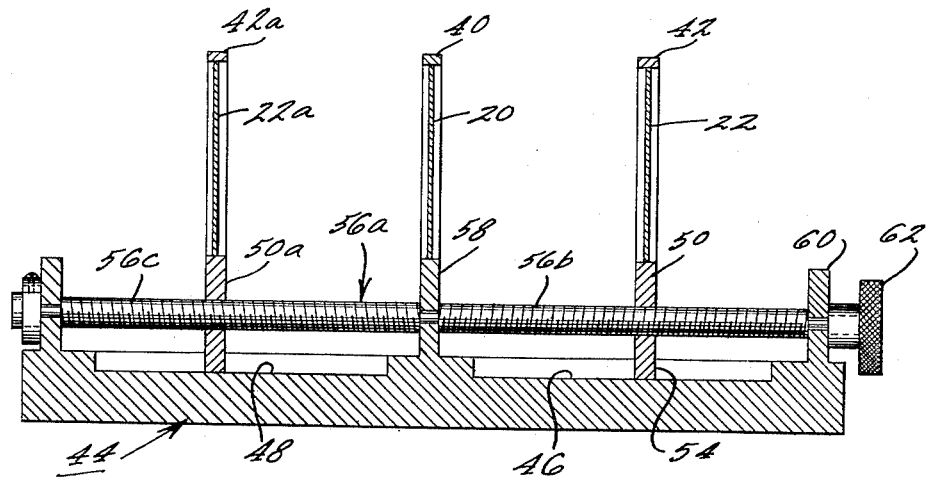
Fig. 4 is another embodiment, in vertical cross-section, of a wavemeter for measuring the wavelength of microwaves in accordance with the present invention.

Referring now particularly to Fig. 1 there is shown an arrangement to illustrate the principles for measuring the wavelength of microwaves of constant frequency transmitted from a microwave transmitter 10, in accordance with the present invention. The microwave transmitter 10 is provided with a directional transmitting antenna 12, such as a horn antenna, for the purpose of transmitting the microwaves directionally toward a directional receiving antenna 14, connected to the input of a microwave receiver 16. The microwave receiver 16 has its output connected to output indicating means, such as an output current meter 18, for the purpose of indicating the intensity, or amplitude, of the received microwaves.

A pair of thin substantially square plates 20 and 22 are positioned in parallel spaced relationship to each other, between the transmitter 10 and the receiver 16, in the path of the microwave transmission, and in a manner whereby they are transverse to the direction of transmission. To measure the wavelength of the transmitted microwaves, the plates 20 and 22 are moved relative to each other along the line of microwave transmission until the output meter 18 indicates that the received microwaves are at a peak intensity. Under these conditions it is known that there exists an integral number of half wavelengths of the microwaves between the plates 20 and 22. For example, in Fig. 1 two half waves 24 and 26 of the transmitted microwave are shown between the plates 20 and 22. Under these conditions reflected half waves 28 and 30 are caused to appear between the plates 20 and 22 whereby to produce standing waves.

The plates 20 and 22 may comprise dielectric material having a relatively high dielectric constant and relatively low internal losses when in the path of microwave transmission. Compounds of titanium oxide, such as $TiO_2$ or $BaTiO_3$, for example, have been found as suitable dielectric materials for the plates 20 and 22.

The plates 20 and 22 may also comprise thin sheets of electrically conductive metal, such as copper or silver foil. Relatively thin sheets of steel coated with copper have also been found satisfactory. The thickness of the plates 20 and 22 should be relatively less than the shortest wavelength intended to be measured. When metal plates are used, the plates 20 and 22 should be perforated with relatively uniformly spaced small holes, as the holes 32 in a plate 34 shown in Fig. 3. The holes 32 should have a diameter size of between substantially ⅛ to ⅜ of the smallest wavelength to be measured, and should comprise about 50 percent of the overall area of the plate in which they are formed.

Referring now to Fig. 1 it will be understood that when the plate 22 is moved a distance X to the position indicated by the dashed outline 22x of the plate 22, an additional half wave 36 and its reflected half wave 38 will appear between the plates 2 and 22x. Under these conditions of standing waves between the plates 20 and 22, the plates 20 and 22 absorb a minimum of energy and, therefore, permit a maximum of microwave energy to be transferred from the transmitter 10 to the receiver 16. It will now be understood that the distance X necessary to move the plate 22 with respect to the plate 20, in order to obtain two successive peak readings on the output meter 18, is the length of a half wavelength of the microwaves transmitted by the transmitter.

Referring now to Fig. 2, there is shown a preferred embodiment for incorporating the plates 20 and 22 in an instrument that may be used as a wavemeter for measuring the wavelength of microwaves, in accordance with the present invention. The plates 20 and 22 may be mounted in suitable frames 40 and 42. The frame 40 may be fixed to a substantially rectangular base 44. The base 44 is formed with a groove 46, of rectangular cross-section, in the upper surface 48 thereof, and parallel to the long edges of the base 44.

The frame 42 is formed with a lower portion 50 having a bottom surface 52 in contact with the upper surface 48 of the base 44. Extending downwardly from the bottom surface 52 of the portion 50 is a guide extension member 54 in engagement with the surfaces forming the groove 46 for guiding the frame 42 in its movements with respect to the frame 40. The guide extension member 54 is of rectangular cross-section and is adapted to guide the frame 42 in a manner whereby it will always remain parallel to the frame 40.

Means are provided to move the plate 22 with respect to the plate 20. To this end, a screw 56 is in threaded engagement with the lower portion 50 of the frame 42. The screw 56 is journaled into a lower portion 58 of the frame 40. The portion 58 of the frame 40 acts as a bearing for the screw 56. The screw 56 is also journaled into a flange 60 extending upwardly from the upper surface 48 of the base 44. The screw 56 is provided with a knurled knob or head 62. It will now be understood that by rotating the screw 56, by means of the knurled head 62, the frame 42, and consequently the plate 22 positioned therein, by any suitable means, may be moved toward or away from the plate 20 positioned in the fixed frame 40, by any suitable means. A pointer 64, fixed to the lower portion 50 of the frame 42, and extending laterally therefrom, may be used to indicate the distance of the plate 22 from the plate 20 on a scale 66 provided on the upper surface 48 of the base 44. It will be understood that the pointer or indicator 64 may comprise a vernier (not shown) for cooperation with the scale 66, where very accurate measurements are desired.

The plates 20 and 22, illustrated in Fig. 2 as relatively thin sheets of dielectric material such as barium titanate, may be replaced by perforated metallic sheets of the type shown in Fig. 3.

The operation of the wavemeter, shown in Fig. 2, in accordance with the principles of the present invention, will now be described. Let it be assumed that it is desired to measure the wavelength of a microwave transmission of substantially constant frequency, such as transmitted by the transmitter 10, in Fig. 1. The wavemeter shown in Fig. 2 will then be positioned between the transmitter 10 and the receiver 16 so that the plates 20 and 22 of the wavemeter are transverse to the direction of transmission, and parallel to each other. The wavemeter may be surrounded by microwave shielding material (not shown) for the purpose of eliminating spurious interference. The screw 56 is now turned slowly by the operator, as by turning the knob 62, so that the plate 22 moves either toward or away from the plate 20. The output meter 18, connected to the receiver 16, is watched and the turning of the screw 56 is stopped when the output meter 18 indicates a peak intensity. The distance between the plates 20 and 22 is now noted, by the position of the indicator 64 with respect to the scale 66. The screw 56 is now turned once more so that the plate 22 is again moved with respect to the plate 20. Let it be assumed that the distance between the plates 20 and 22 is increased. The output meter 18 will read a successive peak intensity when the distance is increased a half wavelength of the microwave being measured. Twice this increased distance is, therefore, the wavelength of the microwave transmitted by the transmitter 10.

Figure 5:
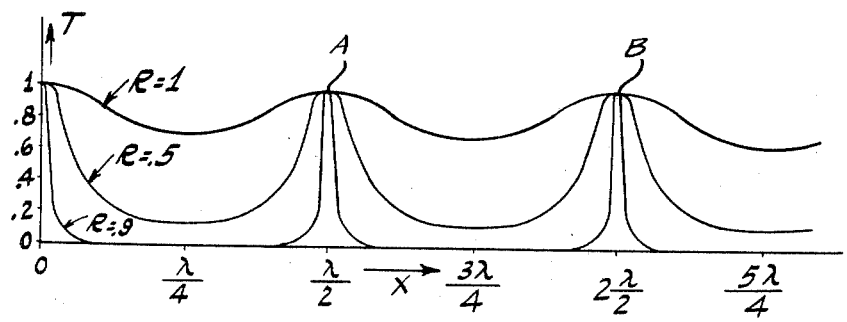
Fig. 5 is a graph used to explain operation of wavemeters operating in accordance with the present invention.

Referring now to Fig. 5 there is shown a graph wherein the abscissa represents distance and the ordinate represents the transmission coefficient T. The transmission coefficient T is the value of the ratio between the power transmitted through the two plates 20 and 22 of the wavemeter to the power applied. It can be shown that the transmission coefficient T for the wavemeter of Fig. 2 is:

$$T = \frac{\text{Power Transmitted}}{\text{Power in}}$$

$$= \frac{P^2}{1 - 2R \cos \frac{4\pi X}{\lambda} + R^2}$$

where P is the ratio of the power transmitter to the power applied for one plate, R is the ratio of the power reflected from one plate to the power applied, X is the distance between the two plates and λ is the wavelength of the microwave being measured. P and R are functions of the plate thickness and dielectric constants when dielectric plates are used. When perforated metallic sheets or foil, of the type illustrated by sheet 34 of Fig. 3 are used, P and R are functions of the hole size and the area of the holes with respect to the overall area of the sheet or foil.

From the aforementioned formula it can be shown that T is a maximum when:

$$X = n\frac{\lambda}{2}$$

where X is the distance between the two plates, and $n$ is an integer.

It will be noted, by referring to Fig. 5, that peak intensities, such as at A and B, occur for integral multiples of half wavelengths of the microwave being measured. It will also be noted that the peak intensities are relatively sharper and better defined when the reflection coefficient R is larger.

Referring now to Fig. 4, there is shown a modification, in vertical longitudinal cross-section, of the wavemeter illustrated in Fig. 2. The wavemeter of Fig. 4 differs from that of Fig. 2 in that the former has an additional plate 22a mounted in a frame 42a and adapted to move with respect to the fixed plate 20 in a mirror image relationship to the plate 22. A screw 56a comprises a left handed screw portion 56b, for example, for threaded engagement with the lower frame portion 50 of the frame 42; and an opposite pitched thread, that is, a right handed thread 56c in threaded engagement with the lower frame portion 50a of the frame 42a. Thus, it will be understood that by turning the head or knob 62 in one direction, each of the plates 22 and 22a will move toward the fixed plate 20 at the same rate. By rotating the knob 62 in an opposite direction, the plates 22 and 22a will move away from the fixed plate 20 at the same rate. The frames 42 and 42a are positioned along the screw 56a in such a manner that the movable plate 22 will be at the same distance from the fixed plate 20 as the movable plate 22a is from the fixed plate 20.

With the wavemeter illustrated in Fig. 4, it is possible to obtain sharper peak intensities in the output meter of the microwave receiver when the wavemeter is in the path of the microwave transmission and the distances between the plates 22 and 20, and 22a and 20 are an integral multiple of half wavelengths of the microwave transmission.

Thus, there has been shown and described a wavemeter of relatively simple construction and operation, in accordance with the objects of the present invention. While this invention has been described by reference to particular embodiments, it is obvious that further arrangements and refinements will occur to those skilled in the art. For example, the screw means for moving the plates of the wavemeter with respect to each other may be made more exacting, as by the addition of a vernier, and the indicating means for indicating the distances between the two plates may be altered in accordance with constructions well known in the art. It is, therefore, intended that the appended claims cover all such equivalent variations as come within the true spirit and scope of the invention.

What is claimed is:

1. A wavemeter comprising a plurality of similar parallel plates each having relatively high reflectivity and relatively low internal losses when in the path of electromagnetic waves, means to cause relative motion between said plates in a direction transverse thereto, and means to measure the distance between adjacent plates, said distance being equal to $$\frac{n\lambda}{2}$$

where $\lambda$ is the length of said waves, and $n$ is an integer.

2. A wavemeter comprising a plurality of similar parallel plates each having relatively high reflectivity and relatively low internal losses when in the path of electromagnetic waves, means to cause relative motion between said plates in a direction transverse thereto, means to measure the distance between adjacent plates, each of said plates having a thickness relatively less than the minimum wavelength said wavemeter is adapted to measure, and said distance being equal to $$\frac{n\lambda}{2}$$

where $\lambda$ is the length of said waves, and $n$ is an integer.

3. A wavemeter comprising a plurality of similar parallel plates each having relatively high reflectivity and relatively low internal losses when in the path of electromagnetic waves, means to cause relative motion between said plates in a direction transverse thereto, means to measure the distance between adjacent plates, said plurality of plates comprising three parallel plates, and said means to cause relative motion between adjacent plates comprising means to maintain one of said plates stationary and means to cause the other two plates to move equal distances with respect to said stationary plate.

4. A wavemeter comprising a plurality of similar parallel plates each having relatively high reflectivity and relatively low internal losses when in the path of electromagnetic waves, means to cause relative motion between said plates in a direction transverse thereto, means to measure the distance between adjacent plates, said plurality of plates comprising two plates, said means to cause relative motion between adjacent plates comprising means to maintain one of said plates stationary and means to move the other plate with respect to said stationary plate, and said distance being equal to $$\frac{n\lambda}{2}$$

where $\lambda$ is the length of said waves, and $n$ is an integer.

5. A wavemeter comprising a plurality of similar parallel plates each having relatively high reflectivity and relatively low internal losses when in the path of electromagnetic waves, means to cause relative motion between said plates in a direction transverse thereto, and means to measure the distance between adjacent plates, said plates being of an insulating material having a relatively high dielectric constant.

6. A wavemeter comprising a plurality of similar parallel plates each having relatively high reflectivity and relatively low internal losses when in the path of electromagnetic waves, means to cause relative motion between said plates in a direction transverse thereto, and means to measure the distance between adjacent plates, said plates being of an insulating material comprising the titanate radical.

7. A wavemeter comprising a plurality of similar parallel plates each having relatively high reflectivity and relatively low internal losses when in the path of electromagnetic waves, means to cause relative motion between said plates in a direction transverse thereto, means to measure the distance between adjacent plates, said plates comprising sheets of electrically conductive material, said material being formed with a plurality of substantially uniformly spaced holes, and said holes comprising substantially 50 percent of the overall area of said material, said distance being equal to $$\frac{n\lambda}{2}$$

where $\lambda$ is the length of said waves, and $n$ is an integer.

8. A wavemeter comprising a plurality of similar parallel plates each having relatively high reflectivity and relatively low internal losses when in the path of electromagnetic waves, means to cause relative motion between said plates in a direction transverse thereto, means to measure the distance between adjacent plates, said plates comprising sheets of electrically conductive material, said material being formed with a plurality of substantially uniformly spaced holes, said holes comprising substantially 50 percent of the overall area of said material, and said holes having a diameter between one-eighth and three-eighths of the minimum wavelength said wavemeter is adapted to measure.

9. A method of measuring the wavelength of microwaves with the aid of at least two similar plates having relatively high microwave reflectivity and low internal losses when in the path of said microwaves, said method comprising directionally transmitting microwaves whose wavelength is to be measured, detecting said directional microwaves, placing said plates parallel to each other and transverse to and in the path of said microwave transmission, moving said plates relative to each other until said detected microwaves exhibit a first peak intensity, changing the distance between said plates until said detected signals exhibit a second peak intensity, and measuring the distance of motion between said plates necessary to cause two successive peaks, said last-mentioned distance being one-half of said wavelength of said microwaves.

10. A method of measuring the wavelength of transmitted microwaves directed toward a receiver with the aid of at least two similar plates having relatively high microwave reflectivity and low internal losses when in the path of said microwaves; said method comprising confining said microwaves to a relatively narrow path, placing said plates in said path of and transverse to said transmitted microwaves, moving said plates relative to each other along the path of microwave transmission until the microwaves passing through said plates are of peak intensity, changing the distance between said plates until the microwaves passing therethrough exhibit a successive peak intensity, and measuring the distance of motion necessary to cause said successive peaks.

11. Means for the determination of the wave length of electromagnetic wave energy in free space comprising a source for producing electromagnetic wave energy in free space, means interposed in said electromagnetic wave energy and movable through a multiplicity of wave lengths of said wave energy in the direction of propagation of said electromagnetic wave energy said means capable of transmitting and reflecting portions of said energy, means associated with said last named means for measuring the distance through which said last named means is moved, and disposed in the direction of propagation relative to said movable means for reflecting a portion of said wave energy toward said first means and for indicating the number of half wave lengths through which said means is moved whereby the wave length of the electromagnetic wave may be determined.

References Cited in the file of this patent

UNITED STATES PATENTS

| | | |
|---|---|---|
| 2,245,138 | Zottu | June 10, 1941 |
| 2,419,208 | Frantz | Apr. 22, 1947 |

OTHER REFERENCES

"A Method of Wavelength Measurement for the Centimeter and Millimeter Wave Regions," Office of Naval Research Publication, April 30, 1956.